United States Patent [19]
Crafts et al.

[11] Patent Number: 5,521,834
[45] Date of Patent: May 28, 1996

[54] METHOD AND APPARATUS FOR CALCULATING DYNAMIC POWER DISSIPATION IN CMOS INTEGRATED CIRCUITS

[75] Inventors: Harold S. Crafts, Colorado Springs; Richard D. Blinne, Ft. Collins, both of Colo.

[73] Assignees: AT&T Global Information Solutions Company, Dayton, Ohio; Hyundai Electronics America, Milpitas, Calif.; Symbios Logic Inc., Fort Collins, Colo.

[21] Appl. No.: 159,976

[22] Filed: Nov. 30, 1993

[51] Int. Cl.⁶ .................................................. G06F 17/50
[52] U.S. Cl. ............................................ 364/489; 364/488
[58] Field of Search .................................. 364/488, 489, 364/490, 578

[56] References Cited

U.S. PATENT DOCUMENTS

| | | | |
|---|---|---|---|
| T935,003 | 6/1975 | Linville et al. | 364/489 |
| 4,698,760 | 10/1987 | Lembach et al. | 364/490 |
| 5,349,542 | 9/1994 | Brasen et al. | 364/578 |

OTHER PUBLICATIONS

"Estimation of Power Dissipation in CMOS Combinational Circuits" by S. Devadas et al., IEEE Custom Integrated Circuits Conferences, 1990, pp. 19.7.1–19.7.6.

"Synchronous Path Analysis in MOS Circuit Simulator" by V. D. Agrawal, IEEE 19th Design Automation Conference, 1982, pp. 629–635.

J. Mavor et al., Introduction to MOS LSI Design, chapters 2.9, 2.10, 3.6 and 3.7, Addison–Wesley Publishers Limited, 1983, pp. 41–49 and 79–85.

*Primary Examiner*—Vincent N. Trans
*Attorney, Agent, or Firm*—Wayne P. Bailey; Douglas S. Foote

[57] ABSTRACT

A method and apparatus for approximating power dissipation using a computer-assisted engineering (CAE) system. Initially, a determination is made of the capacitive load for each cell in a netlist for the CMOS circuit, preferably from cell library data sheets. In addition, the capacitive loads of the interconnects between stages are estimated. A switching rate for each cell is then calculated using one of two alternative methods. The first method assumes that the patterns of input signals are statistically independent, and thus estimates the switching rate from the structure of the cell and the switching rates of the inputs. The second method uses known information concerning the relative times when the input signals are high or low to determine the switching rate of the cell. Once the switching rate is known, the output frequency for the cell can be determined. The power dissipation for each cell is then calculated by multiplying the output frequency by the capacitive load. The dynamic power dissipation for the circuit is determined by summing the power dissipation terms for each of the cells making up the netlist.

22 Claims, 3 Drawing Sheets

METHOD AND APPARATUS FOR CALCULATING DYNAMIC POWER DISSIPATION IN CMOS INTEGRATED CIRCUITS

BACKGROUND OF THE INVENTION

1. Field of the Invention

The present invention generally relates to CMOS circuit design, and in particular, to a method and apparatus for estimating power dissipation in CMOS circuits.

2. Description of Related Art

A large class of CMOS integrated circuits have essentially zero static power dissipation. Nearly all of the energy consumed in the operation of these circuits is dissipated charging and discharging capacitive loads within the circuit and driving external loads connected to the circuit. If the external loads are also CMOS integrated circuits, the power dissipated in charging the capacity of the external loads is also dynamic.

Currently, estimating power dissipation in CMOS integrated circuits can only be done with a simulation of the logic therein. Power dissipation can be accurately simulated by processing an activity file generated with the help of a logic simulator together with a library of cell-based power models. However, the accuracy of the result depends upon the set of patterns used to exercise the logic during the simulation and the accuracy of the power models used with the simulator. Moreover, complete netlists are required or the calculations cannot be performed.

Thus, there is a need in the art for an improved method and apparatus for calculating the dynamic power dissipation in CMOS integrated circuits that provides an approximate result without the requirement for a complete netlist and a set of input stimuli.

SUMMARY OF THE INVENTION

To overcome the limitations in the prior art described above, and to overcome other limitations that will become apparent upon reading and understanding the present specification, the present invention discloses a method and apparatus for approximating power dissipation in a CMOS circuit.

Initially, a determination is made of the capacitive loads for each cell in a netlist for the CMOS circuit, preferably from cell library data sheets. In addition, the capacitive load of the interconnects between stages are estimated.

A switching rate for the cell is calculated using one of two alternative methods. The first method assumes that the patterns of input signals are statistically independent, and thus estimates the switching rate from the structure of the cell and the switching rates of the inputs. The second method uses known information concerning the relative times when the input signals are high or low to determine the switching rate of the cell.

Once the switching rate is known, the output frequency for the cell can be determined. The power dissipation for each cell is then calculated by multiplying the output frequency by the capacitive load. The dynamic power dissipation for the circuit is determined by summing the power dissipation terms for each of the cells making up the netlist.

The above calculations are performed for those cells where all the inputs are known. Moreover, the calculations can be performed on any section of the netlist and are independent of the circuit stimulus. Typically, the calculations begin at the cells connected to the input pads for the circuit, wherein the switching rates are specified. Once the calculations have been performed for one or more specific cells, the output frequencies of the cell are then propagated as input frequencies stage by stage or layer by layer until the calculations have been performed for all of the cells in the netlist.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The energy E stored in the capacitive load for a CMOS gate is given by:

$$E = \tfrac{1}{2}(CV^2)$$

wherein C is the capacitance and V is the voltage. This energy is dissipated when the load is charged and discharged, so the total energy per cycle is $(CV^2)$ and the power dissipated by the gate is $(CV^2)F_{out}$, where $F_{out}$ is the output frequency or the reciprocal of the period at which the output of the gate changes state. Thus, the power dissipation can be approximated using a statistical average energy per gate per transition and a statistical average frequency of transitions per gate. In a circuit comprising a plurality of gates, the values for all gates are summed to obtain the average dynamic power dissipation for the circuit.

Figure 1:
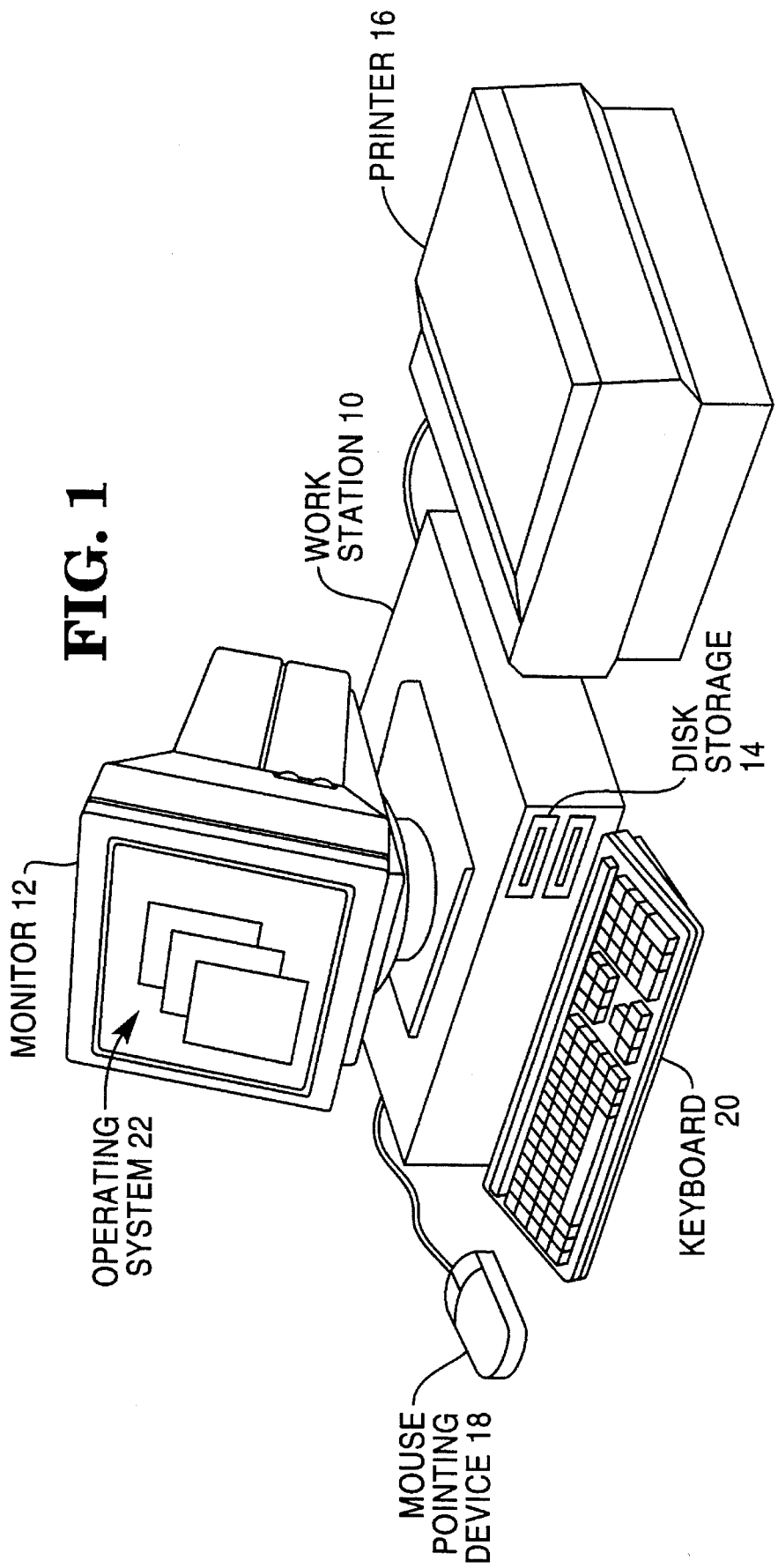
FIG. 1 illustrates one possible embodiment of the hardware comprising the present invention.

FIG. 1 illustrates one possible embodiment of the hardware comprising the present invention. The present invention is typically incorporated into a computer-assisted engineering (CAE) system for designing electronic circuits. The CAE system typically operates on a computer work station 10. It is envisioned that attached to the work station 10 will be monitor 12, disk storage 14, and printer 16 peripherals. Also included in the preferred embodiment are input devices, for example, a mouse pointing device 18 and a keyboard 20. In addition, the work station 10 operates under the control of an operating system 22.

Figure 2:
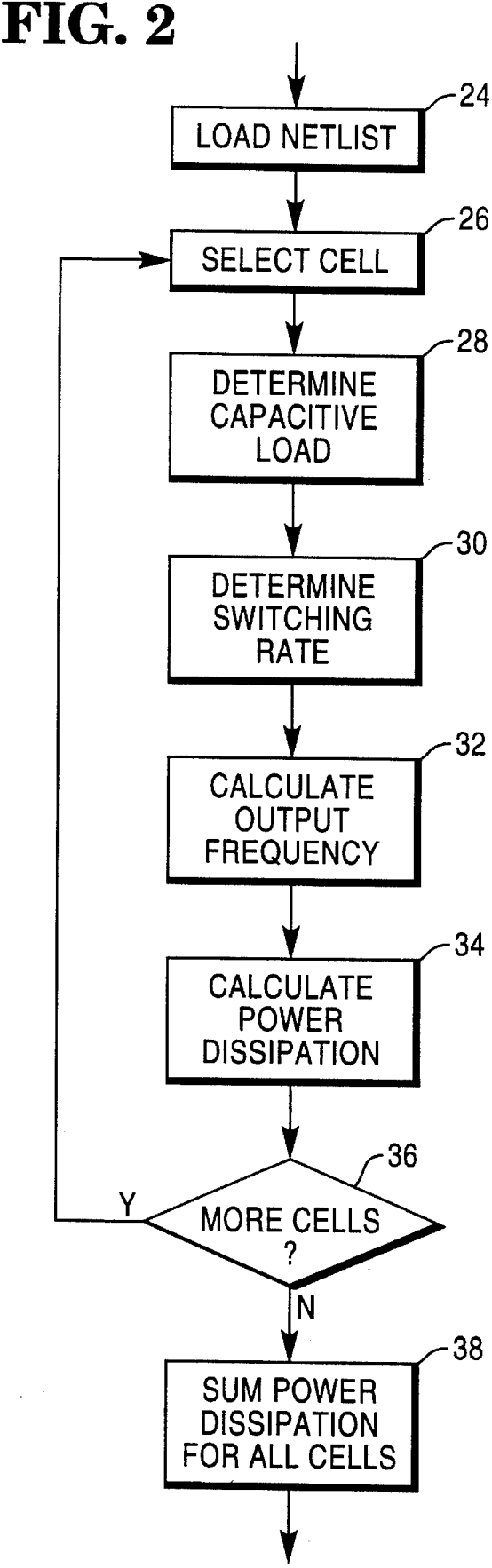
FIG. 2 is a flowchart illustrating the logic of the present invention.

FIG. 2 is a flowchart illustrating the logic performed by the CAE system in the present invention. Block 24 represents the loading of a netlist for a CMOS circuit into the memory of the work station 10. Block 26 represents the specification of an average capacitive load of the interconnects between cells. Block 28 represents the selection of a cell from the netlist, wherein all the inputs of the selected cell are known (e.g., either specified or propagated from prior calculations). Block 30 represents the determination of a capacitive load for the cell, preferably from cell library data sheets stored in memory on the work station 10. Block 32 represents the calculation of a switching rate for the cell.

The present invention incorporates two alternative methods, described further below, for determining the switching rate of each cell in the netlist. The first method assumes that the patterns of input signals are statistically independent, and thus estimates the switching rate from the structure of the cell and the switching rate of the inputs. The second method uses known information concerning the relative times when the input signals are high or low to determine the switching rate of the cell.

Once the switching rate is known, block 34 represents the determination of the output frequency for the cell. Block 36 represents the calculation of the power dissipation for each cell by multiplying the output frequency by the capacitive load. Block 38 represents the propagation of the output frequency as the input frequencies for connected cells. Block 40 represents the repeating of these calculations row by row or stage by stage through all of the cells in the circuit. Block 42 represents the calculation of the dynamic power dissipation for the circuit by summing the power dissipation terms for each of the cells making up the netlist.

Thereafter, the dynamic power dissipation for the circuit may be stored in memory on the work station 10, displayed on the monitor 12, or printed on printer 16. Similarly, the power dissipation, capacitive load, switching rate, and output frequency terms for each of the cells in the logic network may be stored in memory on the work station 10, displayed on the monitor 12, or printed on printer 16.

FIRST PREFERRED EMBODIMENT

The method of the first preferred embodiment requires only netlist information to estimate dynamic power dissipation for a circuit. By assuming that the input signals are statistically independent, the first method can estimate power dissipation based on the structure of the gate and the switching rates of the inputs. This is best illustrated using simple gates, their truth tables and state diagrams showing power dissipating transitions.

Figure 3:
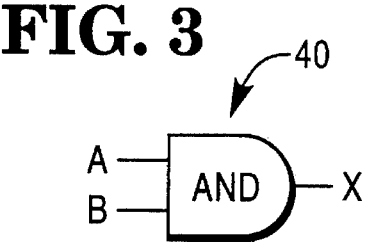
FIG. 3 is a block diagram of a simple AND gate.
Figure 4:
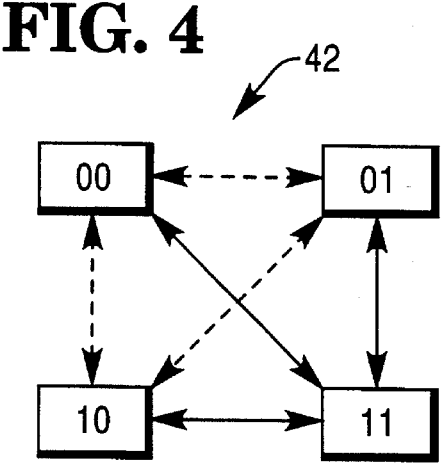
FIG. 4 is a state diagram illustrating the state transitions for the AND gate.

FIG. 3 is a block diagram of a simple AND gate 44, and FIG. 4 is a state diagram 46 illustrating the state transitions for the AND gate. The diagram of FIG. 4 can be thought of as a square where each corner represents one combination of the two variables. There are three vectors starting from each corner and transitioning to the other corners, wherein each horizontal or vertical vector represents a transition with a single input variable changing state and each diagonal vector represents a transition with both input variables changing state. The transitions indicated by solid lines dissipate energy, and the transitions indicated by dotted lines do not dissipate energy. Six of the transitions dissipate power, as represented by the three solid lines with arrows on each end of the line. Four of these transitions, involving two variables, can be represented as a sequence of two transitions, thereby resulting in eight single variable transitions, four of which dissipate power. Therefore, the probability of a state transition dissipating power is 0.5, and the output transition rate, i.e., the cell switching rate, is one half that of the input transition rate.

This result can be generalized to the case of n input variables. In the case of n variables, there are $2^n$ corners on an n dimensional cube with n vectors radiating from each corner along the edges of the cube. Therefore, the number of transitions involving a single variable is given by the product $n*2^n$. For the case of an AND gate 44, or an OR gate, only one output state is different from all the others, so power is only dissipated in transitioning to and from that state. This output state is represented by one corner of the n dimensional cube and there are n edges of the cube terminating in every corner. That means there are 2n output transitions which dissipate power, so the average switching rate $R_{av}$ is the output transition rate divided by the input transition rate:

$$R_{av}=2n/n2^n=1/(2^{n-1})$$

In the case where any number of inputs are allowed to change state at once, the total number of transitions is given by the product of $2^n(2^n-1)$, since there are $2^n$ states and each state can transition to any of the $2^n-1$ other states. For an AND gate 44, or an OR gate, wherein all but one of the states has the same output, the number of output transitions is $2(2^n-1)$, because going into or out of the state causes an output transition and there are $2^n-1$ other states as destinations. So the average switching rate is:

$$R_{av}=2(2^n-1)/2^n(2^n-1)=(2^{n-1})^{-1}$$

which is the same result as above, independent of the number of inputs changing state.

The input to the gate changes state whenever one of the input signals change, so the input frequency of state changes is the sum of the frequencies on each of the inputs. For a two input gate, this results in an output frequency of:

$$F_{out}=\frac{1}{2}(F_a+F_b)$$

wherein $F_a$ and $F_b$ are the input frequencies for the two inputs a and b.

For a three input gate, this results in an output frequency of:

$$F_{out}=\frac{1}{4}(F_a+F_b+F_c)$$

wherein $F_a$, $F_b$, and $F_c$ are the input frequencies for the three inputs a, b, and c.

In general terms, the output frequency is:

$$F_{out} = (2^{n-1})^{-1} \left( \sum_{i=1}^{n} F_i \right)$$

or:

$$F_{out} = R_{av} \left( \sum_{i=1}^{n} F_i \right)$$

wherein $F_i$ is the input frequency for the signal on the ith pin.

Figure 5:
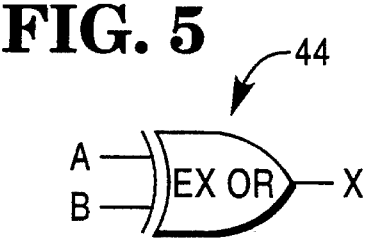
FIG. 5 is a block diagram of an exclusive-Or gate.
Figure 6:
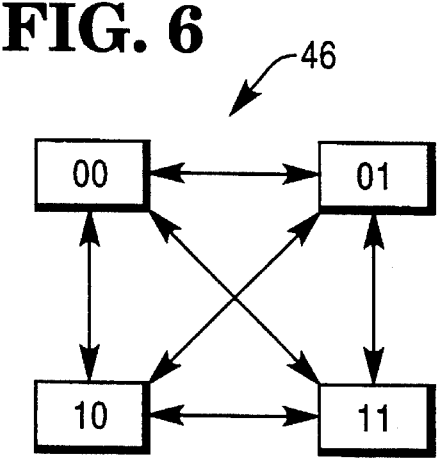
FIG. 6 illustrates a state diagram of the exclusive-OR gate.

FIG. 5 is a block diagram of an exclusive-OR gate 48, and FIG. 6 illustrates a state diagram 50 of the exclusive-OR gate 48. In the case of a two input exclusive-OR gate 48, there are a total of twelve transitions, wherein eight of the transitions represent output transitions. Since each of the four states is symmetrical, the result for each state will be the same. The number of output transitions for one state can be multiplied by the number of states. Generalized to n inputs, the number of output transitions is:

$$(2^n)(2^n-1)$$

and the average switching rate $R_{av}$ is the ratio of output transitions to input transitions:

$$R_{av} = 2^n(2^{n-1})/(2^n)(2^n-1) = (2^{n-1})/(2^n-1)$$

resulting in an output frequency $F_{out}$ of:

$$F_{out} = (2^{n-1})/(2^n - 1) \left( \sum_{i=1}^{n} F_i \right)$$

or $$F_{out} = R_{av} \left( \sum_{i=1}^{n} F_i \right)$$

For the case of a single input transitioning, the result this time is different. As can be seen in FIG. 6, when one input changes state, the transition dissipates power. When two inputs change state, the transition does not dissipate power. The single variable transitions, as before, occur along the edges of the n dimensional cube. For an exclusive OR gate 48, power is dissipated so as long as only a single input changes state.

In summary, the method of the first preferred embodiment, by assuming that the input signals are statistically independent, can estimate power dissipation based on the structure of the gate and the switch rates of the inputs.

SECOND PREFERRED EMBODIMENT

The method of the second preferred embodiment may be used as an alternative in which some of the assumptions are replaced with additional knowledge about the circuit. The second method requires information about the relative times when the inputs are high or low to estimate dynamic power dissipation. If the information is available, the second method is more accurate than the first method.

In the second method, each cell or gate output has an identified frequency, a percentage of time that the output is high, and a state machine description. The second method begins by examining each cell in the netlist that has input signals with identified frequencies and defined percentages where the signal is high. Note that the cells may have to be broken into their constituent parts comprising AND, OR, and NOT gates, as well as flip-flops before these calculations can be performed. Further, note that multiple drivers of a net implies an OR gate.

The power estimation for a cell is a function of its output frequency and the type of the cell. The second method calculates the output frequency $F_{out}$ for a specific cell, and then propagates the calculated output frequencies $F_{out}$ as input frequencies to other cells in the network.

In general, the output frequency $F_{out}$ of a single gate is:

$$F_{out} = \sum_{i=1}^{n} F_i \cdot \text{Pass}(i)$$

wherein $F_i$ is the input frequency of the ith pin, Pass(i) is the probability that a particular edge will pass from the input to the output (thus contributing to the output frequency), and n is the number of input pins in the gate.

In the example of an n-input AND gate, assuming that the inputs are statistically independent, the probability of an edge passing from input to output (which occurs when all the other inputs are high) is:

$$F_{out} = \sum_{i=1}^{n} F_i \cdot \left( \prod_{j=1}^{n} \left\{ \begin{array}{l} 1, \ i=j \\ H_j, \ i \neq j \end{array} \right\} \right)$$

wherein $H_j$ is the predicted percentage of time that the signal on the jth pin is high.

Similarly, in the example of an n-input OR gate, assuming that the inputs are statistically independent, the probability of an edge passing from input to output (which occurs when any of the inputs are high) is:

$$F_{out} = \sum_{i=1}^{n} F_i \cdot \left( \prod_{j=1}^{n} \left\{ \begin{array}{l} 1, \ i=j \\ L_j, \ i \neq j \end{array} \right\} \right)$$

wherein $L_j$ is the predicted percentage of time that the signal on the jth pin is low. Note that, for both AND and OR gates, when n equals one, then $F_{out}$ is $F_{in}$.

In the example of an n-input exclusive-OR gate, an edge will pass from input to output no matter what the state of the other pins. Thus, the probability of an edge passing from input to output is:

$$F_{out} = \sum_{i=1}^{n} F_i$$

In the example of a NOT gate, the high time is one minus the high time of the input signal, and the output frequency is the same as the input frequency.

The second method generally applies only to simple gates. Complex gates with internal nodes can be broken down into equivalent simple gates to calculate the equivalent power dissipation. However, flip-flops will exhibit feedback, and the feedback loops must be broken and assumptions made concerning the input frequency.

A better approach with flip-flops is to make an equivalent circuit consisting of a D-type flip-flop and combinational logic (which is treated as described above). The power model for the D-type flip-flop has a constant term proportional to the clock frequency, and an output term proportional to the input frequency, but limited by the clock frequency, since the function of the flip-flop is simply to delay the input. Thus, the output frequency $F_{out}$ is equal to the minimum of the clock frequency or the input frequency, and the high time is ½. The constant term accounts for internal power, while the term proportional to input frequency accounts for both internal power and power dissipated in the load.

In the second method, the calculations are performed on the netlist in an iterative manner. Each pass through the netlist performs the calculation for each cell for which all of the input frequencies are known. When a pass through the netlist does not result in any calculations, the process is finished or there are conditions, such as feedback, in the netlist which prevent the process from completing. In the case of feedback, the feedback paths are broken, and assumptions made about the input frequency for the broken inputs, so that the calculation can then be completed. The calculations can be minimized by ordering the netlist from input to output.

In summary, the method of the second preferred embodiment uses information about the relative times when the inputs are high or low to estimate dynamic power dissipation. If the information is available, the second method is a more accurate alternative than the first method.

CONCLUSION

This concludes the description of the preferred embodiment of the invention. In summary, a method and apparatus is disclosed for approximating power dissipation in a CMOS circuit.

Initially, a determination is made of the capacitive loads for each cell in a netlist for the CMOS circuit, preferably from cell library data sheets. In addition, the capacitive load of the interconnects between stages are estimated.

A switching rate for the cell is calculated using one of two alternative methods. The first method assumes that the patterns of input signals are statistically independent, and thus estimates the switching rate from the structure of the cell and the switching rates of the inputs. The second method uses known information concerning the relative times when the input signals are high or low to determine the switching rate of the cell.

Once the switching rate is known, the output frequency for the cell can be determined. The power dissipation for each cell is then calculated by multiplying the output frequency by the capacitive load. The dynamic power dissipation for the circuit is determined by summing the power dissipation terms for each of the cells making up the netlist.

The above calculations are performed for those cells where all the inputs are known. Moreover, the calculations can be performed on any section of the netlist and are independent of the circuit stimulus. Typically, the calculations begin at the cells connected to the input pads for the circuit, wherein the switching rates are specified. Once the calculations have been performed for one or more specific cells, the output frequencies of the cell are then propagated as input frequencies stage by stage or layer by layer until the calculations have been performed for all of the cells in the netlist.

The principal advantage of the present invention is that it is able to estimate the power dissipation based only on the existence of a netlist and an input specification. No simulation has to be performed, and no patterns need to be generated to exercise the logic network. The accuracy with which the present invention calculates the estimated power level may be limited, but the accuracy can be improved if additional information is available. Moreover, the present invention produces boundary conditions that are useful in determining actual power dissipation limits. The method of the first preferred embodiment assumes statistical independence, a single transition per clock period, and multiple inputs changing state to calculate the power level. The method of the second preferred embodiment uses the known high time for each input, and thus may lead to a higher power estimation than the first method. As a result, the two methods may result in values that can be used as upper and lower bounds on the estimated power dissipation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. In a computer having a memory, a method of calculating a power dissipation value in an electronic circuit, comprising the steps of:

(a) retrieving at least one input frequency rate value for the circuit from the memory of the computer;

(b) retrieving a capacitive load value for the circuit from the memory of the computer;

(c) calculating, in the computer, a switching rate value for the circuit and storing the switching rate value in the memory of the computer;

(d) calculating, in the computer, an output frequency rate value for the circuit by multiplying the switching rate value by the at least one input frequency rate value for the circuit and storing the output frequency rate value in the memory of the computer; and (e) calculating, in the computer, a power dissipation value for the circuit by multiplying the output frequency rate value by the capacitive load value and storing the power dissipation value for the circuit in the memory of the computer.

2. The method of claim 1, wherein the calculating step (d) comprises the steps of:

(1) identifying a structure of the circuit;

(2) selecting a switching rate value based on the structure of the circuit; and (3) calculating, in the computer, the output frequency rate value of the circuit by multiplying the switching rate value by a summation of all the input frequency rate values for the circuit.

3. The method of claim 1, wherein the calculating step (d) comprises the step of calculating, in the computer, the output frequency rate value for the circuit according to:

$$F_{out} = \sum_{i=1}^{n} F_i \cdot \left( \prod_{j=1}^{n} \left\{ \begin{array}{l} 1, \ i=j \\ H_j, \ i \neq j \end{array} \right\} \right)$$

wherein:

$F_{out}$ is the output frequency rate value, $F_i$ is an input frequency rate value of an ith input to the circuit, and $H_j$ is a predicted percentage of time that the jth input to the circuit is high.

4. The method of claim 1, wherein the power dissipation value for the circuit is:

$(CV^2)F_{out}$ wherein:

C is a capacitance value,

V is a voltage value, and $F_{out}$ is the output frequency rate value of the circuit.

5. In a computer having a memory, a method of calculating a power dissipation value in an electronic circuit, comprising the steps of:

(a) retrieving a netlist representing an electronic circuit from the memory of the computer;

(b) identifying a cell in the netlist that has known input frequency rate values;

(c) retrieving a capacitive load value for the identified cell from the memory of the computer;

(d) calculating, in the computer, a switching rate value for the identified cell and storing the switching rate value in the memory of the computer;

(e) calculating, in the computer, an output frequency rate value for the identified cell by multiplying the switching rate value by the input frequency rate values for the identified cell and storing the output frequency rate value in the memory of the computer;

(f) calculating, in the computer, a power dissipation value for the identified cell by multiplying the output frequency rate value by the capacitive load value and storing the power dissipation value for the identified cell in the memory of the computer;

(g) propagating the output frequency rate value for the identified cell as the input frequency rate value for cells coupled thereto;

(h) repeating the identifying step (b) through the propagating step (g) for all the cells in the netlist; and (i) summing, in the computer, the power dissipation values for all the cells in the netlist to determine the power dissipation value for the circuit and storing the power dissipation value for the circuit in the memory of the computer.

6. The method of claim 5, wherein the calculating step (e) comprises the steps of:

(1) identifying a structure of the identified cell;

(2) selecting a switching rate value based on the structure of the identified cell; and (3) calculating, in the computer, the output frequency rate value of the identified cell by multiplying the switching rate value by a summation of all the input frequency rate values for the identified cell.

7. The method of claim 6, wherein the input frequency rate values are statistically independent.

8. The method of claim 6, wherein the switching rate value is $(2^{n-1})^{-1}$ for an AND gate having n-input signals.

9. The method of claim 6, wherein the switching rate value is $(2^{n-1})^{-1}$ for an OR gate having n-input signals.

10. The method of claim 6, wherein the switching rate value is $(2^{n-1})/(2^n-1)$ for an exclusive-OR gate having n-input signals.

11. The method of claim 5, wherein the calculating step (e) comprises the step of calculating, in the computer, the output frequency rate value for the identified cell according to:

$$F_{out} = \sum_{i=1}^{n} F_i \cdot \left( \prod_{j=1}^{n} \left\{ \begin{array}{l} 1, i=j \\ H_j, i \neq j \end{array} \right\} \right)$$

wherein:

$F_{out}$ is the output frequency rate value, $F_i$ is an input frequency rate value of an ith input to the identified cell, and $H_j$ is a predicted percentage of time that the jth input to the identified cell is high.

12. The method of claim 11, further comprising the step of breaking complex cells into their constituent simple gates.

13. The method of claim 5, wherein the power dissipation value for the identified cell is:

$(CV^2)F_{out}$ wherein:

C is a capacitance value,

V is a voltage value, and $F_{out}$ is the output frequency rate value of the identified cell.

14. An apparatus for calculating a power dissipation value in an electronic circuit, comprising:

a computer with a memory coupled thereto, the computer comprising:

means for retrieving a netlist representing an electronic circuit from the memory of the computer;

means for identifying a cell in the netlist that has known input frequency rate values;

means for retrieving a capacitive load value for the identified cell from the memory of the computer;

means for calculating a switching rate value for the identified cell and storing the switching rate value in the memory of the computer;

means for calculating an output frequency rate value for the identified cell by multiplying the switching rate value by the input frequency rate values for the identified cell and storing the output frequency rate value in the memory of the computer;

means for calculating a power dissipation value for the identified cell by multiplying the output frequency rate value by the capacitive load value and storing the power dissipation value for the identified cell in the memory of the computer;

means for propagating the output frequency rate value for the identified cell as input frequency rate values for cells coupled thereto; and means for summing the power dissipation values for all the cells in the netlist to determine the power dissipation value for the circuit and storing the power dissipation value for the circuit in the memory of the computer.

15. The apparatus of claim 14, wherein the means for calculating an output frequency rate value comprises:

means for identifying a structure of the identified cell;

means for selecting a switching rate value based on the structure of the identified cell; and means for calculating the output frequency rate value of the identified cell by multiplying the switching rate value by a summation of all the input frequency rate values for the identified cell.

16. The apparatus of claim 15, wherein the input frequency rate values are statistically independent.

17. The apparatus of claim 15, wherein the switching rate value is $(2^{n-1})^{-1}$ for an AND gate having n-input signals.

18. The apparatus of claim 15, wherein the switching rate value is $(2^{n-1})^{-1}$ for an OR gate having n-input signals.

19. The apparatus of claim 15, wherein the switching rate value is $(2^{n-1})/(2^n-1)$ for an exclusive-OR gate having n-input signals.

20. The apparatus of claim 14, wherein the means for calculating an output frequency rate value comprises means for calculating the output frequency rate value of the identified cell according to:

$$F_{out} = \sum_{i=1}^{n} F_i \cdot \left( \prod_{j=1}^{n} \left\{ \begin{array}{l} 1, i=j \\ H_j, i \neq j \end{array} \right\} \right)$$

wherein:

$F_{out}$ is the output frequency rate value, $F_i$ is an input frequency rate value of an ith input to the identified cell, and $H_j$ is a predicted percentage of time that the jth input to the identified cell is high.

21. The apparatus of claim 20, further comprising means for breaking complex cells into their constituent simple gates.

22. The apparatus of claim 14, wherein the power dissipation value for the identified cell is:

$(CV^2)F_{out}$ wherein:

C is a capacitance value,

V is a voltage value, and $F_{out}$ is the output frequency rate value of the identified cell.

* * * * *